(12) United States Patent
Kang et al.

(10) Patent No.: US 7,970,769 B2
(45) Date of Patent: Jun. 28, 2011

(54) APPARATUS AND METHOD FOR OPTIMIZED INDEX SEARCH

(75) Inventors: In-sun Kang, Seoul (KR); Kyoung-gu Woo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 577 days.

(21) Appl. No.: 11/841,322

(22) Filed: Aug. 20, 2007

(65) Prior Publication Data

US 2008/0126298 A1    May 29, 2008

(30) Foreign Application Priority Data

Nov. 23, 2006    (KR) .................. 10-2006-0116560

(51) Int. Cl.
*G06F 7/00*    (2006.01)
(52) U.S. Cl. ...................................... 707/741
(58) Field of Classification Search ............... 707/3, 741
See application file for complete search history.

(56) References Cited

U.S. PATENT DOCUMENTS

| | | | |
|---|---|---|---|
| 4,945,475 A | 7/1990 | Bruffey et al. | |
| 5,671,416 A * | 9/1997 | Elson | 717/106 |
| 6,721,723 B1 | 4/2004 | Gibson et al. | |
| 2006/0074939 A1 * | 4/2006 | Mazzagatti et al. | 707/100 |
| 2007/0214153 A1 * | 9/2007 | Mazzagatti | 707/100 |

FOREIGN PATENT DOCUMENTS

| | | |
|---|---|---|
| JP | 63-116232 | 5/1988 |
| JP | 06-103134 | 4/1994 |
| JP | 7-210563 | 8/1995 |
| JP | 11-212980 | 8/1999 |
| JP | 2004-062475 | 2/2004 |
| KR | 1999-42386 | 6/1999 |
| KR | 2001-64226 | 7/2001 |
| KR | 2005-77681 | 8/2005 |

OTHER PUBLICATIONS

Office Action issued in corresponding Korean Patent Application No. 2006-0116560 dated Oct. 30, 2007.
English Abstract for Korean Patent Publication No. 100256686 B1.
Japanese Office Action issued on Aug. 31, 2010, in corresponding Japanese Patent Application No. 2007-242525 (4 pages).

* cited by examiner

*Primary Examiner* — Greta L Robinson
*Assistant Examiner* — Jensen Hu
(74) *Attorney, Agent, or Firm* — NSIP Law (57) ABSTRACT

An optimized index-searching apparatus and method, the optimized index-searching method including: searching an index for a first field corresponding to a first key value; searching, when a search request is input, a second field corresponding to the search request based on the first field; and extracting an identifier corresponding to the found second field.

14 Claims, 7 Drawing Sheets

FIG. 1

| RID | TITLE | TIME | YEAR | MONTH | DAY |
|---|---|---|---|---|---|
| ... | ... | ... | ... | ... | ... |
| 132 | ON STREET 1 | 20040101-17:30 | 2004 | 01 | 01 |
| 133 | ON STREET 2 | 20040101-17:45 | 2004 | 01 | 01 |
| 134 | CUTTING CAKE 1 | 20040115-22:00 | 2004 | 01 | 15 |
| 135 | CUTTING CAKE 2 | 20040115-22:10 | 2004 | 01 | 15 |
| 136 | WHOLE FAMILY TOGETHER | 20040115-22:30 | 2004 | 01 | 15 |
| ... | ... | ... | ... | ... | ... |
| 148 | CHRISTMAS TREE | 20051220-19:30 | 2005 | 12 | 25 |
| 149 | TREE DECORATION CLOSE-UP | 20051220-19:35 | 2005 | 12 | 25 |
| 150 | OPENING PRESENT | 20051220-20:00 | 2005 | 12 | 25 |
| 151 | SING | 20051231-19:00 | 2005 | 12 | 31 |
| ... | ... | ... | ... | ... | ... |

12 spans YEAR, MONTH, DAY columns.

APPARATUS AND METHOD FOR OPTIMIZED INDEX SEARCH

CROSS-REFERENCE TO RELATED APPLICATION

This application claims the benefit of Korean Application No 2006-116560 filed on Nov. 23, 2006 in the Korean Intellectual Property Office, the disclosure of which is incorporated herein by reference.

BACKGROUND OF THE INVENTION

1. Field of the Invention

Aspects of the present invention relate to an optimized index-searching apparatus and method, and more particularly, to a search method and an optimized index-searching apparatus using an index that increases an efficiency of a storage space and provides various operations.

2. Description of the Related Art

Metadata-based user interfaces (UI) have become popular with the advances and increasing popularity of digital content technologies. Searching for content using only a folder and file name is difficult when there is a large amount of data. However, the metadata-based UI can change a search condition in order to search for content, and enables a user to easily remember the metadata value.

Specifically, in metadata-based browsing, a multi-level clustering-based UI enables a user to more conveniently understand the distribution of content, and efficiently access desired content by applying various search conditions. The multi-level clustering-based UI clusters content classified by level, and uses an index in order to move between the clusters.

Clustering refers to grouping similar objects. In the multi-level clustering, each cluster divided by the N th (N≧1) condition can be further divided into more detailed clusters by the (N+1)th condition. The content browser selects the clustering-based UI by dividing the entire content into a plurality of clusters by a predetermined condition, and then providing the divided content to a user.

Figure 1:
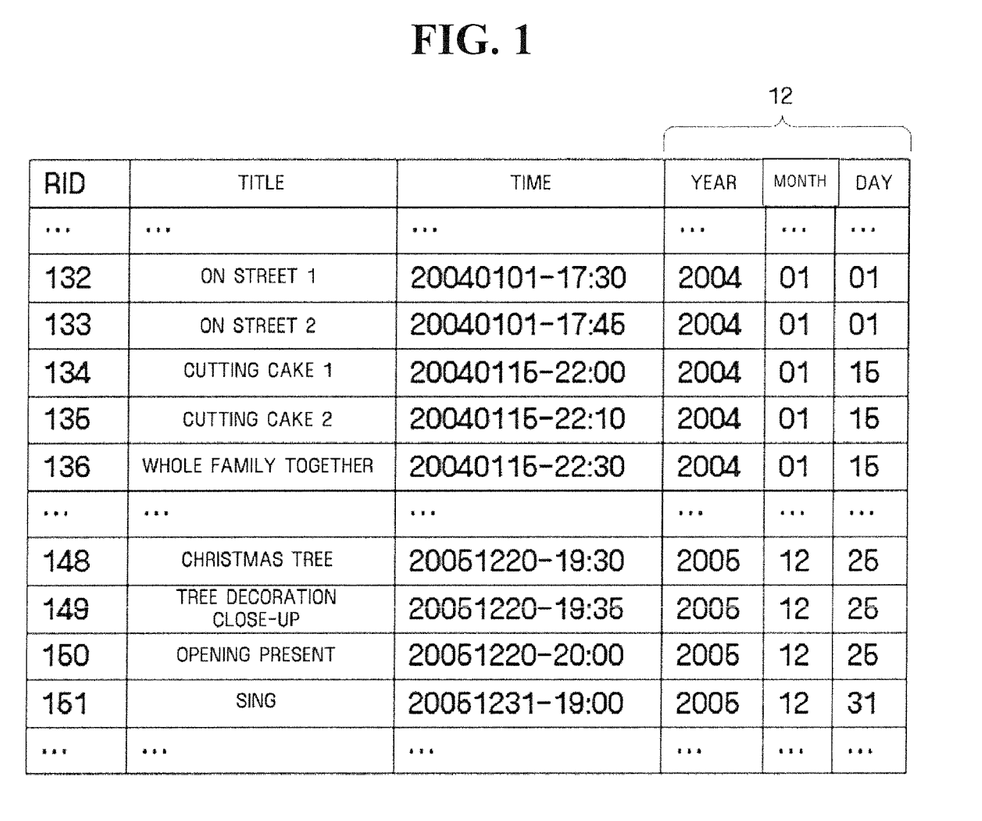
FIG. 1 illustrates a schema of a table that stores image information.

FIG. 1 illustrates a schema of a table that stores image information. As shown in FIG. 1, there are fields 12 corresponding to information on a year, a month, and a day for each record of the table. Images managed by the table are clustered by each of three levels based on the year, the month, and the day fields 12 via the multi-level clustering-UI, and are then shown on a screen. The clusters of the lowest level (i.e., "day") are ordered by title and displayed. To embody the multi-level clustering-UI, image records included in the cluster should be extracted from a database.

If photos included in 2006 (first level) May (second level) 1 (third level) are desired to be browsed, the records may be displayed on a screen through the following query: "Select*from Table where year=2006 and month=5 and day=1 order by title."

When an inquiry including a predetermined condition for several fields (such as the above inquiry) is processed without a proper index, a longer time for processing the inquiry is needed according to an increase in the number of the image records. When an equal (=) is used in the query and there is a sorting condition for the lowest field, a multi-column B+ tree index is used. The multi-column B+ tree index combines the corresponding fields and uses them as a key of the index.

Figure 2:
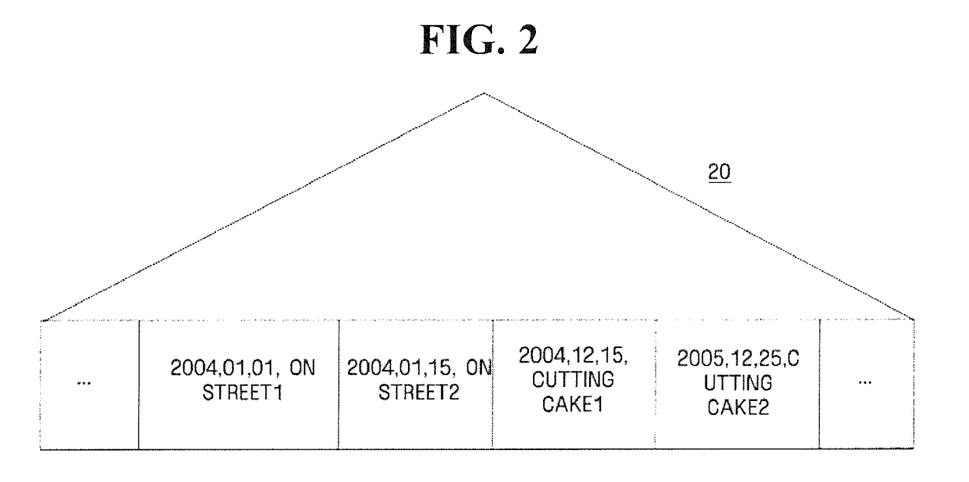
FIG. 2 depicts the structure of a multi-column B+ tree index.

FIG. 2 depicts the structure of a multi-column B+ tree index 20. As shown in FIG. 2, if the multi-column B+ tree index 20 is used, when year, month, and day are selected as a specific value, entries of the index satisfying a predetermined condition are already arranged in a title order, and are adjacent to each other. Therefore, there is no additional arrangement cost that can reduce the time spent on the query.

Figure 3:
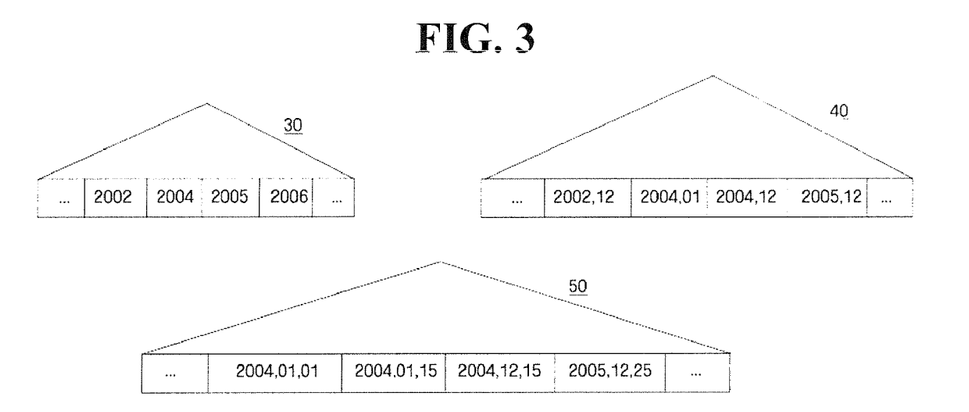
FIG. 3 depicts a multi-column B+ tree index for storing a multi-level cluster.

The multi-column B+ tree index can be used when browsing a second level (month) or first level (year) instead of a third level (day). However, additional indexes are required (as shown in FIG. 3) because a longer time is needed for obtaining a cluster's name shown by each upper level using only the multi-column B+ tree index 20. To obtain clusters to be displayed on the first level using only the multi-column B+ tree index 20, all entries of the index should be read, which cannot satisfy the response time needed for an interactive screen configuration.

FIG. 3 depicts a multi-column B+ tree index for storing a multi-level cluster. As mentioned above, to reduce the response time, an additional index 30 is required in order to quickly search which value exists in the corresponding field. When a user wants to display the clusters configuring the first level, names of the first level clusters are used as an index. If a user wants to display records included in a predetermined cluster (e.g., a cluster corresponding to 2005), the multi-column B+ tree index successively reads records of 2005 ("year=2005").

When clusters are browsed in the second level, the multi-column B+ tree index of "year, month" 40 is required in order to reduce the response time. When clusters are browsed in the third level, the multi-column B+ tree index of "year, month, day" 50 is required. If the number of fields that configure entire levels is N, the total number of the required multi-column B+ tree indexes is N. Accordingly, the first level key value is repeatedly stored in N indexes and the second level key value is stored in N−1 indexes, which causes a waste of storage space.

SUMMARY OF THE INVENTION

Aspects of the present invention provide an optimized index-searching apparatus and method that uses a more efficient index that increases an efficiency of a storage space and provides various operations.

According to an aspect of the present invention, there is provided an optimized index-searching method including: searching an index for a first field corresponding to a first key value; searching, when a search request is input, the index for a second field corresponding to the search request and based on the first field; and extracting an identifier corresponding to the second field.

According to another aspect of the present invention, there is provided an optimized index-searching apparatus including: a searching unit to search an index for a first field corresponding to a first key value and, when a search request is input, to search for a second field corresponding to the search request and based on the first field; and an extracting unit to extract an identifier corresponding to the second field.

According to yet another aspect of the present invention, there is provided a cell of an index used in an optimized search for a field corresponding to a search request level input by a user, the cell including: a first field storing a first key value of a first level; a second field storing a second key value of a second level; a first pointer pointing to another node of another cell containing another first key value of the first level, different from the first key value; and a second pointer pointing to another node of another cell containing another second key value of the second level, different from the second key value, wherein an identifier identifying metadata of content or the content corresponds to the first key value and the second key value.

According to still another aspect of the present invention, there is provided an optimized index-searching method including: searching an index for a first field corresponding to a first key value; receiving a search operation on a designated level that is lower than a level of the first field; performing the search operation on a second field, corresponding to the designated level, based on the first field; and extracting an identifier corresponding to a second key value stored in the second field.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 4:
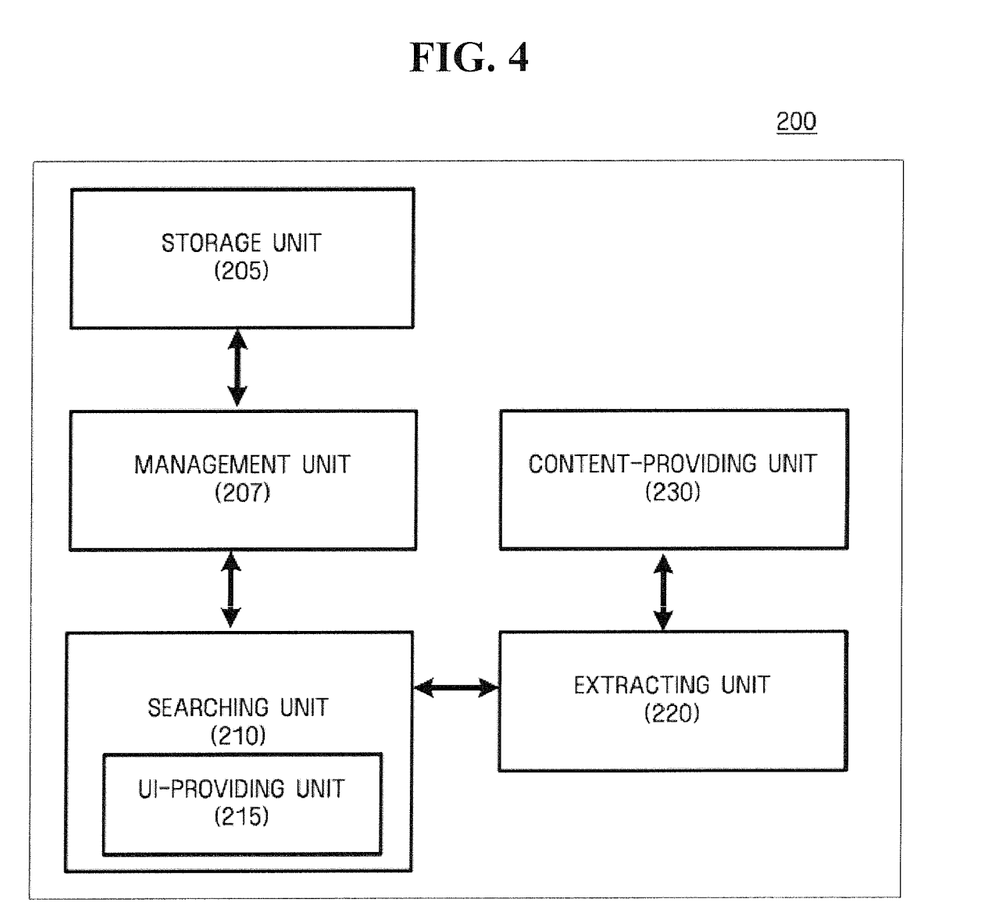
FIG. 4 is a block diagram showing an optimized index-searching apparatus according to an embodiment of the present invention.

FIG. 4 is a block diagram showing an optimized index-searching apparatus 200 according to an embodiment of the present invention. The optimized index-searching apparatus 200 includes a storage unit 205, a management unit 207, a searching unit 210, a UI-providing unit 215, an extracting unit 220, and a content-providing unit 230.

The storage unit 205 stores a key value and an identifier in the index. The key value may be stored in each field of the index and the identifier may be a record ID (RID). Each field of the index stores one or more pointers that indicate a node where a previous key value and a next key value are stored. If the previous key value and/or a next key value exist in the same node, storage of the pointer can be omitted. The index structure according to aspects of the present invention will be described with reference to FIGS. 6 through 9.

The management unit 207 manages the values stored in the storage unit 205. For example, the management unit 207 arranges, adds, deletes, and updates the stored values.

The searching unit 210 searches the index for a corresponding field. If a request is input, the searching unit 210 searches a field of a level corresponding to the request. The searching unit 210 may include the UI-providing unit 215, or the UI-providing unit 215 may be arranged separately.

The UI-providing unit 215 provides a user interface (UI) to a user so that the user can search for a field corresponding to a key value through the provided UI. That is, when a user selects a key value through the UI-providing unit 215, the corresponding field is found via the detecting unit 210, which will be illustrated in FIG. 10.

The extracting unit 220 extracts an identifier corresponding to the found field. The identifier may be a record ID (RID). The extracting unit 220 extracts the RID corresponding to the key value.

The content-providing unit 230 provides a user with metadata of content or content according to the identifier (which may be the RID). Examples of various operations included in the optimized index-searching apparatus 200 will be described with reference to FIG. 10.

The term "unit", as used herein, refers to, but is not limited to, a software or hardware component (such as a Field Programmable Gate Array (FPGA) or an Application Specific Integrated Circuit (ASIC)) that performs certain tasks. A module may be configured to reside in the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 5:
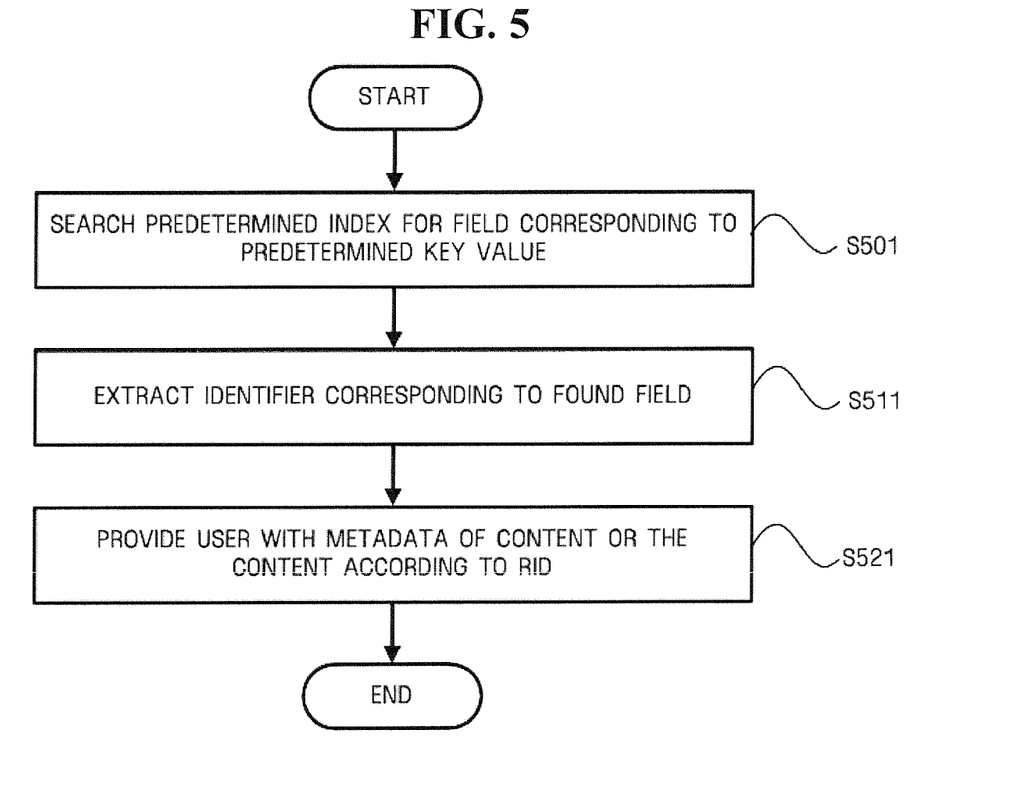
FIG. 5 is a flowchart showing an optimized index-searching method according to an embodiment of the present invention.
Figure 10:
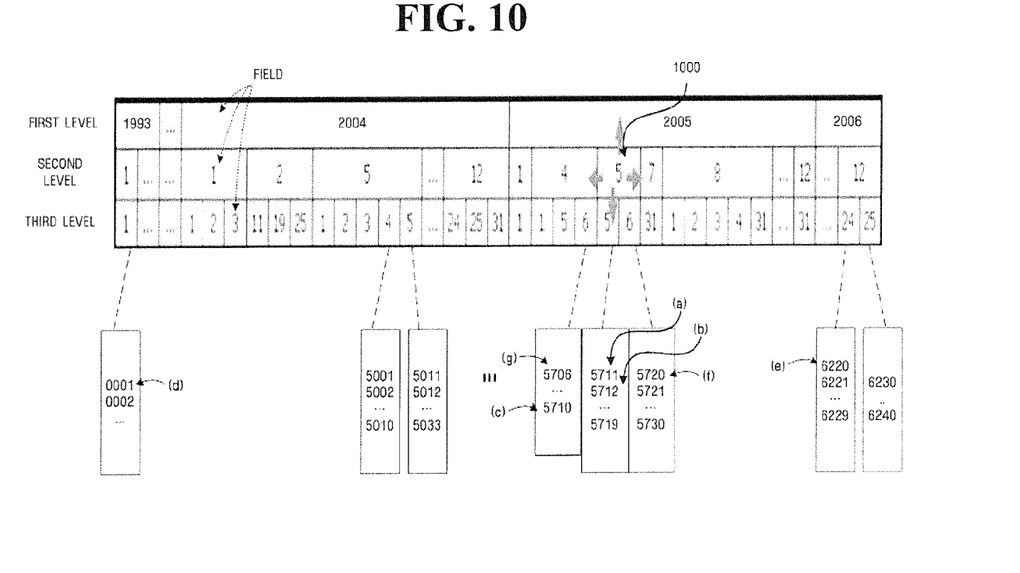
FIG. 10 depicts a UI for an index search according to an embodiment of the present invention.

FIG. 5 is a flowchart showing an optimized index-searching method according to an embodiment of the present invention. Referring to FIGS. 4 and 5, a method of searching for content will now be described. The searching unit 210 searches an index for a field corresponding to a predetermined key value in operation S501. A level of the searched-for key can be designated. That is, when a UI is provided to a user, the user can designate a level of the key via the UI and a field corresponding to the key value is found by the searching unit 210. The user can designate the level by moving to the searched-for field and inputting a searching request. When a request is input via the UI, the searching unit 210 searches the index for a field of the level corresponding to the request. A more specific example is illustrated in FIG. 10.

The extracting unit 220 extracts an identifier (such as an RID) corresponding to the found field in operation S511.

Accordingly, the content-providing unit 230 provides metadata of content or content to a user according to the identifier in operation S521.

Figure 6:
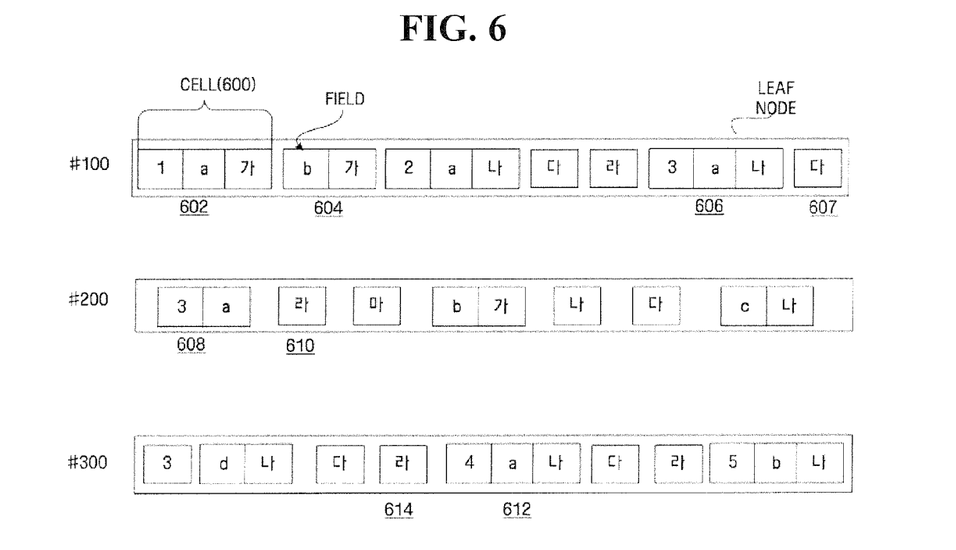
FIG. 6 depicts a leaf node of an index according to an embodiment of the present invention.

FIG. 6 depicts a leaf node of an index according to an embodiment of the present invention. As shown in FIG. 6, it is assumed that a first level field has a numeral value, a second level field has an English letter, and a third level field has a Korean letter in a leaf node of the index. However, it is understood that other and/or different value types, character types, or symbol types may be used for the fields and the different levels of fields (for example, a first level field may be an English letter, a second level field may be a numeral value, a third level field may be a Greek symbol, and a fourth level field may be an English letter). At this time, an entry configured with a key and RID can be stored as a cell structure 600.

In the conventional art, an entire key is recognized as a binary string and divides a prefix. However, keys can be distinguished by a field in the index according to aspects of the present invention. For example, a prefix of "2005, 10" and "2005, 12" is "2005, 1*" in the conventional art but is "2005" according to aspects of the present invention. Accordingly, "1, a, 가" 602 and "b, 가" 604 are originally "1, a, 가" and "1, b, 가", but are stored by omitting the same level field.

In "3, a, 나" 606 stored in a node 100 (a page number of the node), the first level key "3" has a previous key "2" stored in the same node 100 and a next key "4" stored in a node 300. Accordingly, the first level key "3" indicates the node 100 where the key belongs in (where the previous key is stored) and the node 300 as a node where the next key is stored. That is, each field of the index has a pointer that indicates nodes where previous and next keys are stored so that the previous and the next keys can be quickly found.

When "3, a, 라" is stored in the node 200, "3, a" 608 and "라" 610 are divided and stored. That is, the difference between "3, a, 다" 607 and "3, a, 라" is the third field. Accordingly, only "라" 610 is stored. "3, a" 608 is still separately stored in the node 200 as a node prefix in order to know a key value of the upper level without referring to other nodes (i.e., the node 100) when a key is found based on leaf nodes. For example, when the third level key "나" is found in "4, a, 나" 612 of the node 300, it is possible to know the previous key is "3, d, 라" 614 without referring to other nodes. However, it is understood that according to other aspects, the cell is not divided and stored, but stored entirely together (as, for example, "3, a, 라"), even if the upper level key values are the same as those of previous cells, in order to know a key value of the upper level without referring to other nodes. Hereinafter, a detailed node structure of the index will be described with reference to FIG. 7.

Figure 7:
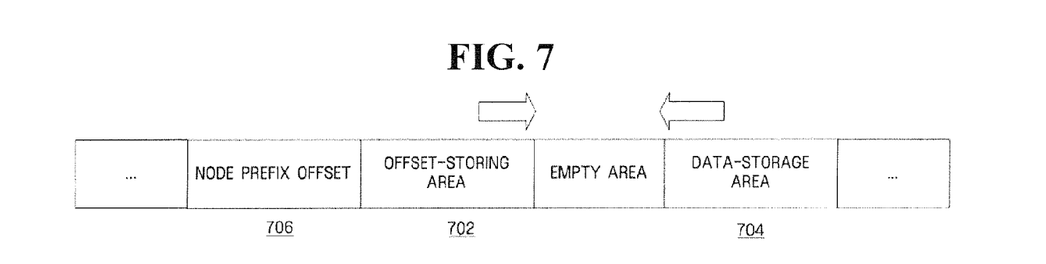
FIG. 7 is a view showing the structure of an index node according to an embodiment of the present invention.

FIG. 7 is a view showing the structure of an index node according to an embodiment of the present invention. A feature of the index structure may be a B+ tree. The B-tree, which was introduced in 1970, includes some transformed B tree versions (such as B+ tree, B* tree, and prefix B tree). The index may be the transformed B+ tree that effectively stores even multi-level-clustering keys. Also, the index may be a balanced tree because whatever keys a user searches for, a corresponding key can be found in the leaf node and the search time will be the same.

The entry configured with keys and RIDs can be stored as a cell structure. Because the length of the key is variable, the cell is divided into an area in which real data is stored 704, and an area in which an offset of data is stored 702 (the length of each is stored), in order to store keys having a variable length. Therefore, the storage space can be variably used. That is, the area for storing offsets 702 flexibly stores data from left to right and the area for storing data 704 flexibly stores data from right to left, so that the storage space can be efficiently used.

In contrast, if the sizes of the two areas 702 and 704 are fixed, the area 704 may fill quickly when the length of real data is long, and the area 702 may be "full" but still empty when the length of real data is relatively short. Therefore, the storage space would not be efficiently used.

An area 706 in which an offset of the node prefix is stored stores the node prefix. If the node does not need a node prefix, the node prefix offset area 706 may be initialized to 0.

Each field can store a pointer that indicates a node containing a previous key and a node containing a next key. If two 4-byte pointers are always maintained for all keys, the space for storing real data may be reduced. Accordingly, if the previous and/or next keys exist in the same node as a current key value stored in the field, each field of the index may omit storing the pointer that indicates nodes where the previous or next keys are stored in order to secure a large space for storing real data. If a previous/next key of ith level exists in the current node, a previous/next key of (i+1)th level also exists in the current node. If a previous/next key of ith level exists in another node, a previous/next key of (i+1)th level also exists in another node. This principle can be used to secure a space. Here, it is assumed that a first level is the highest level.

It is possible to omit storing the pointer that indicates nodes where a previous or next key is stored based on the found (or current) key using the fact that the lower level is subordinated to the upper level. When the searched for level is controlled, an access to additional nodes is not necessary because the upper level key and the lower level key are stored in a single entry.

If (2000, Sep. 1) is the found key in a first node that includes [(2000, Aug. 16), (20), (September $1^{st}$), ($2^{nd}$), ($4^{th}$)], and a second node includes [(2001, Jan. 4), . . . ], when a previous key (2000, August) of the month level exists in the current node, a previous key of the day level (i.e., the clustering level more subdivided than the month level) also exists in the current node. That is, a change of the month level value indicates that the day level value is also changed. When (2000, Aug. $16^{th}$) is the found key, if a next key of the month level exists in the current node, a next key of the day level also exists in the current node.

A cell structure of the index will now be described with reference to FIGS. 8 and 9. Here, a unit of the value input in each field may be a bit or byte, which is shown in the figures. Hereinafter, the unit is indicated as a predetermined value.

Figure 8:
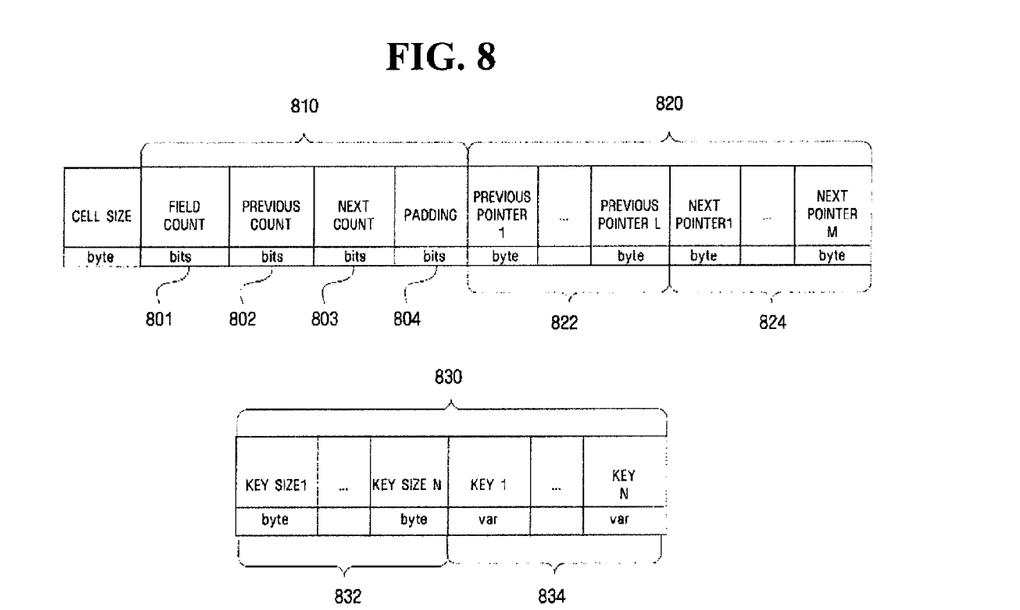
FIG. 8 depicts the cell structure of a leaf node of an index according to an embodiment of the present invention.

FIG. 8 depicts the cell structure of a leaf node of an index according to an embodiment of the present invention. As shown in FIG. 8, in a count information area 810, a field count field 801 shows (or stores) the number of fields configuring (or included in) the cell where the found key exists. For example, referring to FIG. 6, for "3, a, 나" 606, the value of the count field 801 is 3. It is possible to determine a boundary point of each level in the index via the field count field 801 of the cell. That is, in the same node, the boundary point of a level is determined as a field count value of the cell. If the boundary point of the level does not exist in the same node, the boundary point can be found using a node prefix value. Therefore, a start and an end of entries that have the same key value by each level can be quickly found.

A previous count field 802 indicates the number of previous pointers. The next count field 803 indicates the number of next pointers. A padding field 804 is a predetermined reserved storage space.

A pointer area 820 stores a pointer that indicates a node where a previous or next key exists by level. Specifically, when browsing an ith level, the previous pointer field 822 stores a pointer of the node where the previous key is stored based on the ith level. Here, the pointer may be the page number of the node. For example, the previous pointer 1 stores a pointer that indicates the node in which the previous key is stored based on the first level. The previous pointer 2 stores a pointer that indicates the node in which the previous key is stored based on the second level. The previous pointer 3 stores a pointer that indicates the node in which the previous key is stored based on the third level. Referring to FIG. 6, for example, in "3, a, 나" 606 stored in a node 100, the first level key "3" has a previous key "2" stored in the same node 100. Accordingly, the previous pointer field 822 for the cell stores a pointer of the node 100. However, it is understood that when the previous key for the level is stored in the same node, the pointer may, although not necessarily, be omitted (i.e., not stored).

When browsing the ith level, the next pointer field 824 stores a pointer of the node where the next key is stored based on the ith level. Here, the pointer may be the page number of the node. For example, the next pointer 1 stores a pointer that indicates the node in which the next key is stored based on the first level. The next pointer 2 stores a pointer that indicates the node in which the next key is stored based on the second level. The next pointer 3 stores a pointer that indicates the node in which the next key is stored based on the third level. Referring to FIG. 6, for example, in "3, a, 나" 606 stored in a node 100, the first level key "3" has a next key "4" stored in a node 300. Accordingly, the next pointer field 824 for the cell stores a pointer of the node 300. It is understood that when the next key for the level is stored in the same node, the pointer may, although not necessarily, be omitted (i.e., not stored).

In an area where a key value is stored 830, a key size field 832 indicates the length of an i field. For example, when the total number of levels is x (i.e, when the levels are year, month, and day, x=3), a key size has a field data length (byte) of the (x−N+i)th level. The key field 834 indicates data of a predetermined level, and stores data of the (x−N+i)th level. When a value of the field count field 801 is 2 in the count information area 810, the key size of the i field is x−N+I=3−2+1. The key size field 832 indicating the size of a field data of the second level indicates the length of the month data. The key field 834 stores the keys' data values.

With reference to FIG. 6, when all keys are extracted based on the first level, "1, 2, 3, and 4" can be extracted. When all keys are extracted based on the second level, "1a, 1b, 2a, 3a, 3b, 3c, 3d, 4a, and 5b" can be extracted. When all keys are extracted based on the third level, "1a 가, 1b 가, 2a 나, 2a 다, 3a 나, 3a 다, 3a 라, 3a 마, 3b 가, and 3b 나" can be extracted. Accordingly, for "3, a, 나" 606 (or 3a 나), the value of the count field 801 is 3. The value of the previous count field 802 is 0. The value of the next count field 803 is 2. The value of the next pointer 1 field 824 is 300 because the next key (4) based on the first level (3) is stored in the previous count field 802 is 0 (i.e., the previous value of the first level (3), the second level (3a), and the third level (3a 나) exists in the current node 100). Alternatively, according to other aspects, the previous pointer field 822 may store the previous pointer even if the previous values exist in the current node (for example, the previous pointer 1 field, the previous pointer 2 field, and the previous pointer 3 field 822 would each store the value 100 because the previous value of the first level (3), the second level (3a), and the third level (3a 나) exists in the node 100). The value of the next pointer 2 field 824 is 200 because the next key (3b) based on the second level (3a) is stored in the node 200. The next pointer 3 field 824 does not store the next pointer because the value of the third level (3a 나) exists in the current node 100. Alternatively, according to other aspects, the next pointer field 824 may store the next pointer even if the next value exists in the current node (for example, the next pointer 3 field 824 would store the value 100 because the next value of the third level (3a 나) exists in the node 100). In the key size field 832, a value of the key size 1 field is 4, the field value of the key size 2 is 1, and a field value of the key size 3 is 2. In the key field 834, the field value of the key 1 is 3, a field value of the key 2 is a, and a field value of the key 3 is 나.

Because successive key browsing is not performed in an inner node, it is not necessary to maintain a link between keys that exist in different nodes. Accordingly, a previous pointer and a next pointer included in the cell structure of the leaf node can be erased in the cell structure of the inner node. The inner node can have the structure that distinguishes a prefix or maintains total key values like the general multi-column B+ tree index.

As mentioned above, the node prefix can be recorded in the current node even if the node prefix is the upper level field value that was already used as a prefix in the adjacent key of the previous node in order to notify the upper level field value in the current node. The node prefix may not be stored in the same cell where the lower level field value is stored, which can be configured as an additional cell.

Figure 9:
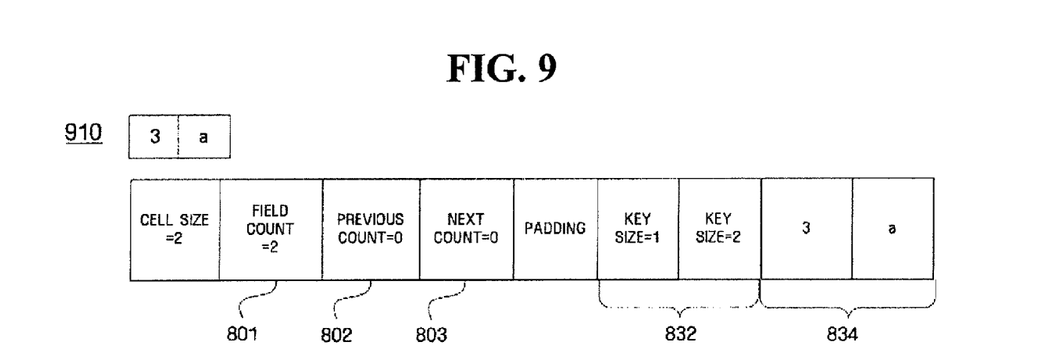
FIG. 9 illustrates an example of a cell structure according to an embodiment of the present invention.

FIG. 9 illustrates an example of the cell structure according to an embodiment of the present invention. In FIG. 9, the cell structure of the node prefix "3, a" 910 of the node 200 shown in FIG. 6 is illustrated with reference to FIG. 8. Because the current key is configured with two fields in the cell structure of the node prefix "3, a" 910 of the node 200, the value of the field count field 801 is 2. The value of the previous and next count field 802 and 803 is 0 because the number of previous and next pointers is 0. Values of the key size field 832 are 1 and 2 corresponding to each key size value of "3, a" 910. Values of the key field 834 are 3 and a. A unit of each value was described with reference to FIG. 8.

FIG. 10 depicts a UI for an index search according to an embodiment of the present invention. As shown in FIG. 10, a user requests to search for the desired content via a UI in order to receive a service. At this time, operations (functions) that use the index structure provided according to aspects of the present invention include find_key, find_next_entry, find_prev_entry, find_first_key, find_last_key, find_next_key, find_prev_key, find_upper_key, and find_down_key. When it is assumed that a level of the clustering key (or key) having a high priority is 1, the year level is 1, the month level is 2, and the day level is 3. Each field includes a key value and RID information as described in FIG. 10. A user can select each field.

A user inputs a search request when a user moves between fields via the UI. When a user selects, for example, 2005, May (which is indicated as "2005, 5" field 1000) via the UI, a value of 2005, 5 (a second level) is input, so an identifier corresponding to the key value is extracted. If there are several extracted identifiers, the first value of the field 1000 can be returned, and content and metadata of the content corresponding to the identifier of the field can be provided to a user. Accordingly, it is possible to directly designate a level (the second level) of the key to be found by a user via the UI, thereby searching for fields using various operations based on the designated level.

Hereinafter, operations will be described in detail with reference to FIG. 10. The find_key operation searches the leaf node for an entry (or field) matched with the searched-for key, and returns an identifier, i.e., RID. If there are many matched RIDs, the first RID is returned. However, according to other aspects, it is understood that another RID may be returned, or all of the matched RIDs may be returned. At this time, a level of the searched-for key can be designated when multi-columns configure the index unlike the conventional art. In FIG. 10, if a user moves to the "2005, 5" field 1000 via the UI, 5711 (a) is returned as an RID. That is, the "2005, 5" field 1000 includes fields 5 and 6 as a lower level and each field includes a plurality of RID values. At this time, the first RID (i.e., 5711 (a)) can be returned and content or metadata of the content corresponding to the identifier of the found field 1000 can be provided to a user. Also, it is possible to search for operations to be performed later based on the "2005, 5" key (or field).

The find_next_entry operation searches for a next entry of the most recently found entry, and returns the key and the identifier (such as an RID). If a key value of the level being searched is changed, the highest level number is also returned among the changed fields. If a new second level key is obtained because the first and the second fields are changed while the entry is browsed based on the second level, level number 1 is returned. If "2005, 5" is found using the find_key operation in FIG. 10, when find_next_entry operation is performed, 5712 (*b*) is returned as an RID.

The find_prev_entry operation searches for a previous entry of the most recently found entry, and returns the key and the identifier (such as an RID). If a key value of the level being searched is changed, the highest level number is also returned among the changed fields. If a new second level key is obtained because the first and the second fields are changed while an entry is browsed based on the second level, level number 1 is returned. If "2005, 5" is found using the find_key operation in FIG. 10, when find_prev_entry operation is performed, "2005, 4" (i.e., a new key value) and 5710 (*c*) (i.e., a corresponding RID) are returned. Because the second field value is changed from 5 to 4 while the entry is found based on the second level, level number 2 is also returned.

The find_first_key operation returns a first key of the leaf node and the first identifier (such as an RID) having the corresponding key. At this time, the find_first_key operation can input a level i of the to-be-returned key unlike the conventional art. Operations to be operated later searche for a key value based on ith level. If the find_first_key operation is performed for the second level in FIG. 10, the find_first_key operation searches for "1993, 1", and returns 0001 (*d*).

The find_last_key operation returns a last key of the leaf node and the last identifier (such as an RID) having the corresponding key. If the upper level field value is changed, the highest level number is also returned. If the first and the second level field values are changed while a value is browsed based on the third level, the highest level number 1 is returned. At this time, the find_last_key operation can input a level i of the to-be-returned key, unlike the conventional art. Operations to be performed later search for a key value based on the i level. If the find_last_key operation is performed for the second level in FIG. 10, the find_first_key operation searches for "2006, 12", and returns 6220 (*e*).

The find_next_key operation searches for a next key value of the most recently found key value in the leaf node, and returns the next key value and the identifier (such as an RID). If the upper level field value is changed, the highest level number is also returned. If the first and the second level field values are changed while a value is searched for based on the third level, the highest level number 1 is returned. At this time, if the most recently found key level is ith, the find_next_key operation can return the next key on the corresponding level, unlike the conventional art. If the find_key operation searches for "2005, 5, 5" in FIG. 10, when the find_next_key operation is performed, a new key value "2005, 5, 6" and RID 5720 (*f*) are returned.

If the level of the key being searched is i, the find_next_key operation completes the search when the field count value is equal to or greater than (the largest field count+1−i) or there is no node to be found. The next count value is obtained by performing the read_key_header operation. If the next count value is less than i, the next key exists in the current node, so cells of the current node are backward searched for from the current cell position. If the next count value is equal to or greater than i, the next key exists in another node. In this case, the find_next_key operation searches for cells backward from the first cell in the node indicated by the next pointer.

The find_prev_key operation searches for a previous key value of the most recently found key value in the leaf node, and returns the next key value and RID. If the upper level field value is changed, the highest level number is also returned. If the first and the second level field values are changed while a value is searched for based on the third level, the highest level number 1 is returned. At this time, if the most recently found key level is ith, the find_prev_key operation can return the previous key of the corresponding level, unlike the conventional art. If the find_key operation searches for "2005, 5, 5" in FIG. 10, when the find_prev_key operation is performed, a new key value "2005, 4, 6" and the RID 5706 (*g*) are returned.

If the level of the key being searched is i, the find_prev_key operation completes the search when the field count value is equal to or greater than (the largest field count+1−i) or there is no node to be found. The previous count value is obtained by performing the read_key_header operation. If the previous count value is less than i, the previous key exists in the current node, so cells of the current node are forward searched for from the current cell position. If the previous count value is equal to or greater than i, the previous key exists in another node. In this case, the find_prev_key operation searches for cells from the last cell to the first cell in the node indicated by the previous pointer.

If the level of the key being searched is i, the find_upper_key operation changes the search level to i−1. All operations to be performed later are performed based on the (i−1)th level key. Also, the find_upper_key operation completes the search when i is 1 (because when i is 1, the current level is the highest level) or the field count is more than (the largest field count+1−i; in this case, the upper level key is included in the current cell). The field count value is obtained by performing the read_key_header operation. The search is performed in the current node by moving to the previous cell until the search completion condition is satisfied. If the key is not found in even the first entry of the current node, the find_upper_key operation searches for the upper key in the node prefix.

If a level of the key being searched is i, the find_down_key operation returns the (i+1)th level key. All operations to be performed later are performed based on the (i+1)th level key. Also, if i is equal to the largest field count (i.e., i is the lowest level), the find_down_key operation has no to-be-returned lower key because the current level is the lowest level. If i is not equal to the largest field count, the find_down_key operation searches for the lower key value in the current cell, and returns it.

The read_key_header operation reads a header value of the cell including a key value of the level being browsed. If the find_next_entry operation, the find_prev_entry operation, or the find_upper_key operation is performed, the most recently found cell may not include the key of the level being browsed. That is, when the level being searched is i, and the field count of the cell in which the search curser locates is f, a case where f<largest field count+1−i is generated. At this time, the key value being searched is already notified. Accordingly, the key value and the search level i are input so that the cell including the corresponding key can be found by performing the find_key operation. Also, the read_key_header operation reads ith information in the current cell when f≧largest field count+1−i. If f<(the largest field count+1−i, the read_key_header operation reads information corresponding to the ith key by performing the find_key operation.

As described above, the optimized index-searching apparatus and method according to aspects of the present invention provide various operations using the index, thereby easily embodying the external module and increasing an efficiency of a storage space. Furthermore, if data is clustered to a single level, aspects of the present invention are designed to identically operate with the conventional B+ tree index, such that the B+ tree index or the multi-column B+ tree index can be applied to data clustered from one to N level.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optimized index-searching method comprising:
   searching an index for a first field corresponding to a first key value;
   searching, in response to a search request, the index for a second field storing a second key value, based on the first field; and
   extracting an identifier corresponding to the second field,
   wherein a cell of the index comprises the first field, the second field, and at least one field storing at least one of a previous pointer that points to a previous node containing a previous key value or a next pointer that points to a next node containing a next key value, the cell of the index omits the field storing the previous pointer if the previous key value exists in the same node as a current key value, and the cell of the index omits the field storing the next pointer if the next key value exists in the same node as the current key value.

2. The method as claimed in claim 1, wherein the index separately stores an upper level key value in a current node to allow browsing of the upper level key value of a predetermined key value without referring to other nodes.

3. The method as claimed in claim 1, further comprising:
   providing metadata of content or a content corresponding to the extracted identifier.

4. The method as claimed in claim 1, wherein the cell further comprises:
   a field count storing a number of fields of the cell.

5. The method as claimed in claim 1, wherein the cell further comprises:
   a first previous pointer pointing to a previous node containing a previous first key value, different from the first key value; and
   a second previous pointer pointing to a previous node containing a previous second key value, different from the second key value.

6. The method as claimed in claim 5, wherein:
   the first previous pointer does not point to the previous node if the previous node is a same node as a node of the cell;
   the second previous pointer does not point to the previous node if the previous node is the same node as the node of the cell; and
   the cell further comprises a previous count storing a number of previous pointers comprised in the cell.

7. The method as claimed in claim 1, wherein the cell further comprises:
   a first next pointer pointing to a next node containing a next first key value, different from the first key value; and
   a second next pointer pointing to a next node containing a next second key value, different from the second key value.

8. The method as claimed in claim 7, wherein:
   the first next pointer does not point to the next node if the next node is a same node as a node of the cell;
   the second next pointer does not point to the next node if the next node is the same node as the node of the cell; and
   the cell further comprises a next count storing a number of next pointers comprised in the cell.

9. A non transitory computer-readable recording medium comprising a cell of an index used in an optimized search for a field corresponding to a search request level input by a user, the cell comprising:
   a first field storing a first key value of a first level;
   a second field storing a second key value of a second level; and
   a first pointer pointing to a next node of another cell containing a next key value of the first level, different from the first key value; and
   a second pointer pointing to a previous node of another cell containing a previous key value of the second level, different from the second key value,
   wherein an identifier identifying metadata of content or a content corresponds to the first key value and the second key value, the first pointer is omitted if the next node is in the same node that the cell is in, and the second pointer is omitted if the previous node is in the same node that the cell is in.

10. The cell as claimed in claim 9, wherein:
    the first pointer is a first next pointer pointing to a next node containing a next first key value, different from the first key value; and
    the second pointer is a second next pointer pointing to a next node containing a next second key value, different from the second key value.

11. The cell as claimed in claim 10, further comprising a next count storing a number of next pointers comprised in the cell.

12. An optimized index-searching method comprising:
    searching an index for a first field corresponding to a first key value;
    receiving a search operation on a designated level that is lower than a level of the first field;
    performing the search operation on a second field, corresponding to the designated level, based on the first field; and
    extracting an identifier corresponding to a second key value stored in the second field,
    wherein a cell of the index comprises the first field, the second field, and at least one field storing at least one of a previous pointer that points to a previous node containing a previous key value or a next pointer that points to a next node containing a next key value, the cell of the index omits the field storing the previous pointer if the previous key value exists in the same node as a current key value, and the cell of the index omits the field storing the next pointer if the next key value exists in the same node as the current key value.

13. The method as claimed in claim 12, wherein:
the receiving of the search operation comprises receiving a find key search operation to find a specific key value, and the performing of the search operation comprises:
searching the index for a second field storing the specific key value and based on the first field.

14. The method as claimed in claim 12, wherein the search operation is one of:
a find next entry operation to find a next entry to a most recently found key value in the designated level;
a find previous entry operation to find a previous entry to the most recently found key value in the designated level;
a find first key operation to return an identifier corresponding to a second key value stored first in a leaf node;
a find last key operation to return an identifier corresponding to a second key value stored last in the leaf node;
a find next key operation to search for a next second key value to the most recently found second key value;
a find previous key operation so search for a previous second key value to the most recently found second key value;
a find upper key operation to change the designated level to a next higher level;
a find down key operation to change the designated level to a next lower level; and
a read key header operation to read a header value of a cell including the second key value.

\* \* \* \* \*